United States Patent
Hellsten

(10) Patent No.: US 7,932,852 B2
(45) Date of Patent: *Apr. 26, 2011

(54) RFI SUPPRESSION IN SAR

(75) Inventor: Hans Hellsten, Linkoping (SE)

(73) Assignee: Saab AB (SE)

( * ) Notice: Subject to any disclaimer, the term of this patent is extended or adjusted under 35 U.S.C. 154(b) by 37 days.

This patent is subject to a terminal disclaimer.

(21) Appl. No.: 12/469,028

(22) Filed: May 20, 2009

(65) Prior Publication Data

US 2009/0278731 A1     Nov. 12, 2009

Related U.S. Application Data

(63) Continuation of application No. 10/551,088, filed as application No. PCT/SE2004/000654 on Apr. 26, 2004, now Pat. No. 7,551,118.

(30) Foreign Application Priority Data

Apr. 25, 2003  (SE) ....................... 0301231

(51) Int. Cl.
    *G01S 13/00*  (2006.01)
(52) U.S. Cl. ........ 342/25 R; 342/192; 342/194; 342/196
(58) Field of Classification Search ............... 342/25, 342/192, 196
    See application file for complete search history.

(56) References Cited

U.S. PATENT DOCUMENTS

| | | | |
|---|---|---|---|
| 5,461,426 A | 10/1995 | Limberg et al. | |
| 5,546,085 A | 8/1996 | Garnaat et al. | |
| 5,657,244 A | 8/1997 | Seitz | |
| 6,028,549 A | 2/2000 | Buckreuss et al. | |
| 6,166,678 A | 12/2000 | Jao | |
| 6,760,487 B1 | 7/2004 | Linares | |
| 6,867,727 B1 | 3/2005 | Mitra | |
| 7,006,553 B1 * | 2/2006 | McCorkle | 375/130 |
| 7,551,118 B2 * | 6/2009 | Hellsten | 342/25 R |
| 2002/0144619 A1 | 10/2002 | Rawcliffe et al. | |

OTHER PUBLICATIONS

"U.S. Appl. No. 10/551,088, Non-Final Office Action mailed Jun. 25, 2008", OARN, 18 pgs.
"U.S. Appl. No. 10/551,088 Response filed Dec. 23, 2008 to Non-final Office Action mailed Jun. 25, 2008", 10 pgs.
"U.S. Appl. No. 10/551,088, Notice of Allowance mailed Feb. 24, 2009", 7 pgs.
"Swedish Patent Office, International Search Report for PCT/SE2004/000654, dated Jul. 27, 2004".
Lord, R., et al., "Approaches to RF interference suppression for VHF/UHF synthetic aperture radar", Proceedings of the 1998 South African Symposium on Communications and Signal Processing, 1998. COMSIG '98., Sep. 7-8, 1988, Chapter I, II and IIIA, (1998), 95-100.

\* cited by examiner

*Primary Examiner* — Thomas H Tarcza
*Assistant Examiner* — Timothy A Brainard
(74) *Attorney, Agent, or Firm* — Schwegman, Lundberg & Woessner, P.A.

(57) ABSTRACT

A filter scheme for broadcast interference cancellation that is computationally efficient and numerically robust Airborne Low Frequency Synthetic Aperture Radar (SAR) operating in the VHF and UHF bands has been shown. At least interference Doppler filtering or interference cancellation is utilized. The interference cancellation involves prediction of the interference for each particular reception interval of mixed interference and radar ground response. This prediction is then coherently subtracted from the incoming signal.

14 Claims, 6 Drawing Sheets

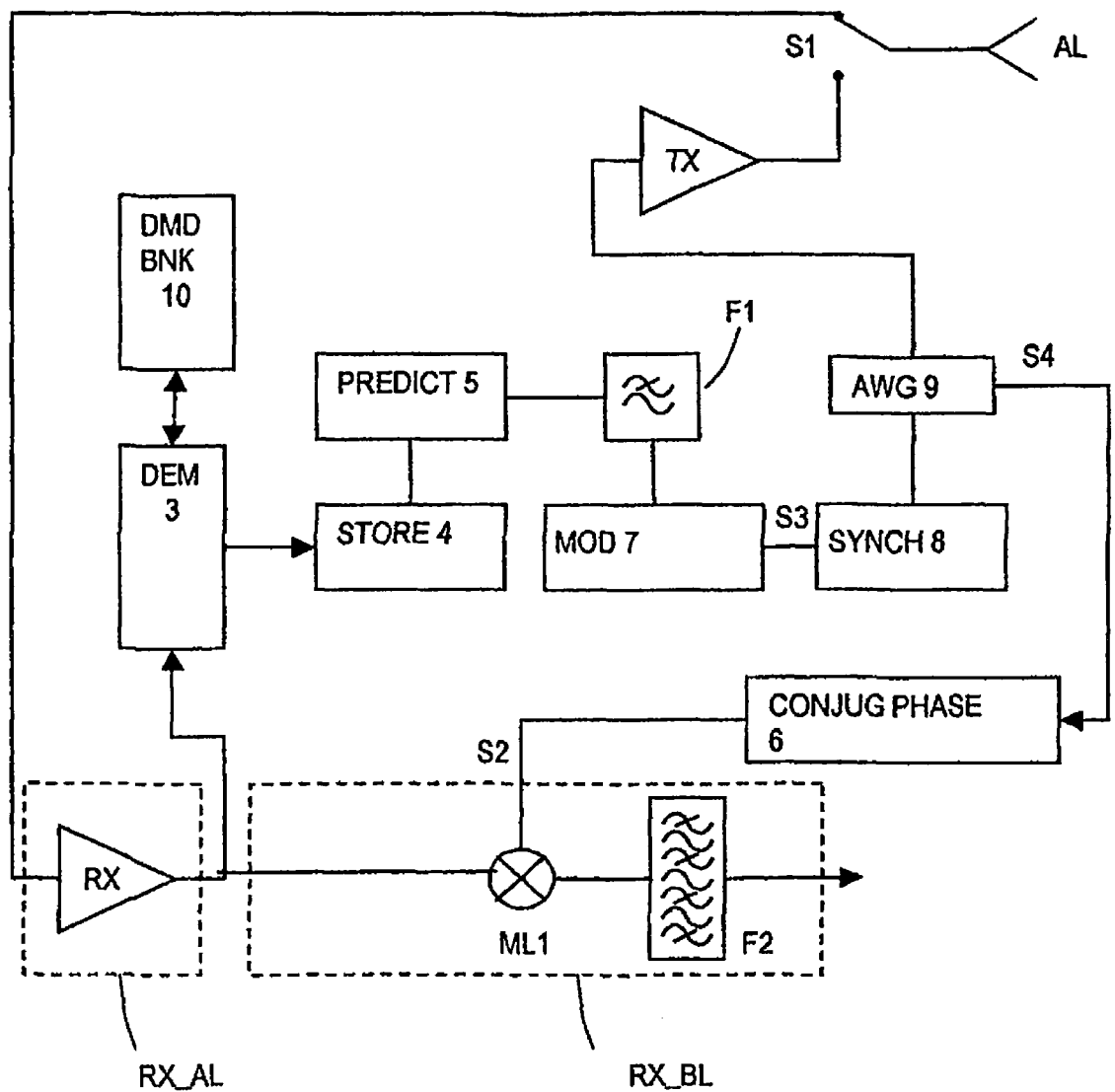
FIG. 1_1

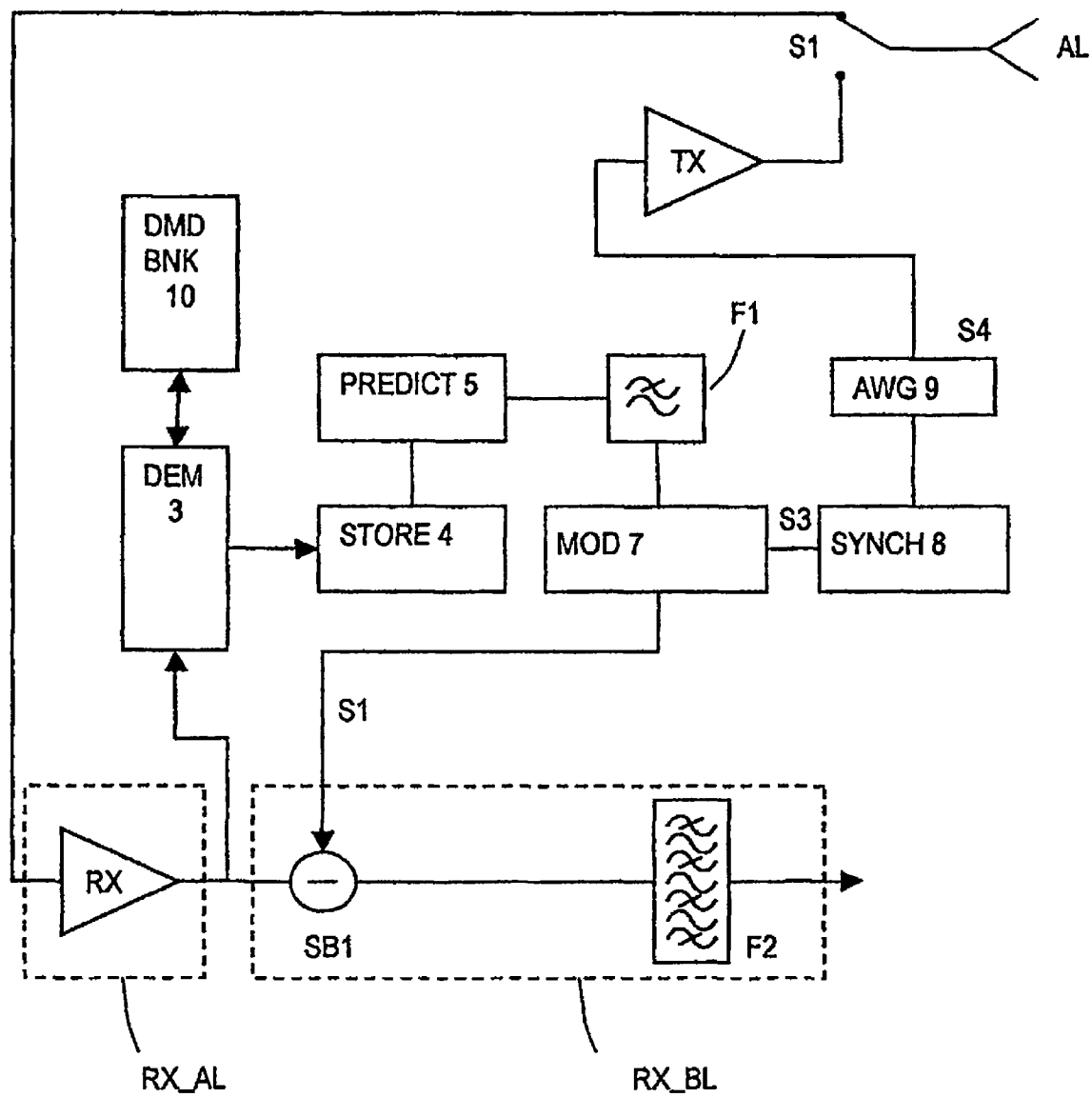
FIG. 1_2

RFI SUPPRESSION IN SAR

RELATED APPLICATIONS

This application is a continuation of U.S. patent application Ser. No. 10/551,088, filed Sep. 7, 2006, now U.S. Pat. No. 7,551,118 which application is a nationalization under 35 U.S.C. 371 of PCT/SE2004/000654 filed Apr. 26, 2004 and published as WO 2004/097451 A1, on Nov. 11, 2004, which claimed priority under 35 U.S.C. 119 to Sweden Patent Application Serial No. 0301231-7, filed Apr. 15, 2003; which applications and publication are incorporated herein by reference and made a part hereof.

FIELD OF THE INVENTION

This invention relates to the field of radar systems co-existing with radio signals for audio and video. More particularly, the present invention relates to the field of synthetic aperture radar, SAR, operating in the VHF/UHF range.

BACKGROUND OF THE INVENTION

Due to technology limitations, early radar development had to rely on the HF/VHF/UHF bands. The ever-increasing demand for frequency bands for radio use has forced some radar applications out of the lower bands.

However, the VHF/UHF bands remain attractive even today where microwave technology makes it feasible to operate in high frequency spectra.

Airborne Low Frequency Synthetic Aperture Radar operating in the VHF and UHF bands is becoming an important emerging technology for wide area surveillance and target detection in foliage. A VHF synthetic aperture radar system denoted CARABAS™ (trade mark?) (Coherent All Radio Band Sensing) SAR system has been described in U.S. Pat. Nos. 4,965,582 and 4,866,446. An ultra wide band coherent radar system has been disclosed U.S. Pat. No. 6,072,420.

To obtain sufficient resolution, viz. a few meters or less, the radar-operating band must extend over several tens of Megahertz, i.e. radar reception must be wide band and occur across frequency bands allocated for radio and TV broadcasting.

The development of airborne multi-octave foliage penetration radars in the VHF and UHF band renews the discussion on how radar and radio can co-exist in the same frequency band. The cohabitation issue is particularly pronounced with television broadcast due to its need for a large bandwidth.

Consider a VHF radar operating in an area of broadcast transmission. Given that radar transmit power is significantly below that of the commercial broadcast station, the operating range of television broadcast stations and the radar emission is of the same order of magnitude and finally that the television subscribers have directional antennas pointing at the broadcast station, the absolute majority of subscribers will receive a television signal, which dominates over the interference from the radar transmitter with respect to power level. The radar receiver on the other hand will sense a one-way propagation television interference signal, dominating strongly over the backscattered radar signal.

The fidelity of analogue television colour reception calls for a very good signal to noise ratio, enabling typically phase representation to within 0.5 deg. This would require 40 dB SNR. Assuming PG=1 MW (given directivity of television transmitter and receiver antenna), $\lambda=5$ m and r=100 km one finds $$P_{TV \to TV} = PG \frac{\lambda^2}{(4\pi)^2 r^2} = -18 \text{ dBm}$$

$$B_{TV} = 5 \text{ MHz}$$

Exterior noise at VHF may be 40 dB above thermal noise, viz for $$P_e = F_e kTB = -70 \text{ dBm}$$

we find that 40 dB SNR gives a 10 dB margin to exterior additive noise. The cited figures seem characteristic of good receiving conditions and thus the expectation that possible interference from radar should not affect TV reception quality.

Now, consider interference caused by 20-90 MHz VHF SAR operating on an aircraft at some typical altitude of 10 km. Say that peak radar transmit power is 1 kW. A linear FM transmit waveform thus radiates 1 kW also in the TV band. With a 0 dB transmit gain (typical omni-directional low frequency SAR antenna) and a 10 dB receiver antenna gain we get PG=10 kW and one has $$P_{Radar \to TV} = PG \frac{\lambda^2}{(4\pi)^2 r^2} < -18 \text{ dBm}$$

Hence, as a worst case, the radar interference and the useful TV signal are of the same order of magnitude. Using a more advanced radar waveform, in which the TV band transmission is present over the entire length of the radar transmit signal, the peak power in the TV band can be reduced by 10 dB. Still compared to the required TV SNR ratio, the interference level remains high.

Another important aspect concerning cohabitation is the radar duty cycle. The peak power figure presumes a relatively large duty cycle—higher than 10%. The relative time under which the TV reception is interfered is thus higher than 1%, depending on the waveform and to some extent the interference level as a trade-off parameter.

TV broadcast antennas are vertically extended in order to depress the transmit signal towards its terrestrial users. For this reason and for the absence of gain in the radar antenna, one may set PG=10 kW for radar reception of a single TV station. As there may be a number of stations active in the spectrum, as a worst case we assume PG=100 kW and get instead of 0

$$P_{TV \to Radar} = PG \frac{\lambda^2}{(4\pi)^2 r^2} = -28 \text{ dBm}$$

As mentioned exterior noise at VHF may be 40 dB above thermal noise, viz. for $B_{radar}=50$ MHz $$P_e = F_e kTB = -60 \text{ dBm}$$

Given the elevated exterior noise temperature, radar transmit power has to be increased to compensate for this noise. The sited figures for radar transmit power are calculated on this presumption. Giving rise to interference levels for television reception of the same order as the actual television signal they can hardly be increased. Hence the 30 dB noise figure of television interference has to be mitigated by other means.

The suppression depth of the mitigation step must consequently be 30 dB. There are several basic mitigation techniques 1. Range spectrum band-pass filtering
2. Doppler spectrum filtering
3. Cancellation The first method implemented by narrow-band notching techniques that can be analogue pre-reception has been explored in connection with the VHF radar work done in Sweden. This option is only feasible if at least the partial band 20-50 MHz is free from TV-interference (?). Removing a significant part of the radar spectrum leads to production of sidelobes, which severely degrades radar performance.

The second method is normally associated with the possibility of removing carrier waves, letting the radar operate coherently in slow time by digital post-reception carrier cancellation techniques. Removal of carrier waves is considered inefficient since in the matched filtering performed by the SAR-processing, the carrier signal combines with its modulation leading to an overall increase in the noise floor.

The third method of cancellation presumes that, the TV signal by some means can be identified and subsequently subtracted from the combined radar/television signal. Active noise cancellation is known in the audio field in which ambient noise is recorded and a mirror signals is processed, amplified generated by means of a loudspeaker. The mirror signal is generated in a timely and accurate fashion so as to cancel the noise at a given point. Since the TV signal has many degrees of freedom, and the required cancellation depth is significant, it is doubtful if such a cancellation can be successful in practice. Even the much simpler case of cancelling a pure carrier is by experience a delicate matter.

SUMMARY OF THE INVENTION

It is a first object of the invention to set forth a radar system in which VHF and UHF band communication signals, e.g. radio and TV signals, are actively suppressed, so as to enable the radar system be used in areas where such signals are prevalent.

Moreover it is a first object of the invention to reduce radar interference on communication services such as audio and television reception. Although the radar signal power received at the television receiver may only give rise to a small interference content, this may still be unacceptable. Hence, it is an object of the invention to mitigate the very energy dominating interference of television broadcast on radar reception. On the other hand, mitigating the disadvantageous effects on radar must occur without requiring increased radar transmit power, which would aggravate television reception.

Radar is a device for range or distance measurements relying on electromagnetic echoes. By accurate timing of the interval from the moment of transmission of electromagnetic pulse until the subsequent return of the echo, the distance to the object giving rise to echo is estimated, making the fundamental assumption that the pulse propagates to the object and back linearly and uniformly at the known speed of light. The accuracy of the range measurement is set by the timing accuracy ultimately limited by the bandwidth and energy of the pulse.

The last statement is particularly noteworthy, viz. that it is the bandwidth and energy and not the detailed shape of the pulse, which sets the range resolution. Thus a transmit radar pulse can have a long duration (much longer than the timing accuracy for the echo), and thus convey a large energy, at the same time spanning bandwidth which provides a high range accuracy.

For signals of a duration larger than the timing accuracy, range determination is achieved by signal processing the received signal through a transmit signal matched filter, so-called "pulse compression". The filter can be realised in both the Fourier domain and the time-domain. In the time domain, such a filter is a correlation between the transmit and receive signal. In the Fourier domain, the filter consists of multiplying the Fourier transform of the received signal with the complex conjugate of the Fourier transform of the transmitted signal. The outcome of this filter is a reflectivity function providing the radar reflectivity as a function of range.

In the particular application of synthetic aperture radar—SAR—the reflectivity is the mean reflectivity of the illuminated ground along circular arcs limited by the radar antenna angular resolution. This mean reflectivity is greatly improved by the SAR principle repeating the measurement for different positions of the SAR platform, moving over the illuminated ground.

Consider now radar operation, spanning over a band, which encompasses one or several TV broadcast bands. This situation occurs for instance in VHF SAR, operating over may be 70 MHz of bandwidth in which one or several TV stations operating across some 5 MHz bandwidth may radiate into the radar antenna. The TV signals are very strong compared to the received radar signal and must in some way be rejected out of the collected data in order that this will represent the ground reflectivity and thus transform into a good SAR image of the ground.

Consider first that no TV broadcast is present. According to what have been stated one may alter the transmit signal from pulse to pulse preserving the bandwidth and the energy of the pulse. This will not affect the reflectivity function determined by pulse compression. Thus, in SAR for instance, one may change the transmitted signal in this way without affecting the SAR image.

According to a first aspect of the invention, the pulse compression is changed from PRF pulse to PRF pulse.

In the case of TV broadcast, the received radar signal will also contain TV signals from the one or several bands encompassed by the radar band. The analogue TV signals, it is noted, consists to a large degree of repetitive messages, viz. each TV frame is quite similar to the next one for intervals of a second or more, and an TV line will therefore be similar to the corresponding TV line in the next frame and so on for maybe 50 frames (the frame rate is about 50 Hz). It is clear that if the radar signal was transmitted in synchronism with the TV frames, the pulse compression signal processing will preserve quasi-periodicity of the TV signal. After some second of radar operation and data collection, the TV signal will thus appear in the received pulse compressed Fourier transformed data as a pin spectrum with 50 Hz separation between pins and may be 1 Hz width of each pin. It will be possible to reject TV signal by applying a comb filter in the Fourier domain.

According to a second aspect of the invention, the radar signal is operated in synchronisation with a given TV signal and filtering is applied for rejecting the TV signal content.

As mentioned above, such rejection principle requires the radar to operate in synchronism with the TV frame rate. One possibility to achieve synchronisation with the TV signal would be to adapt the radar transmit pulse repetition frequency—PRF—so that very precisely each radar transmission would occupy a very precise location in TV frame received onboard the radar platform. In practise, however we may encounter several stations in which frame synchronism may not be precisely upheld. In fact the motion of a SAR platform would by itself induce a frequency shift (Doppler shift) dependent on the relative location of TV transmitter, which prevents a PRF synchronous to all received TV bands.

It is noted that a variable PRF is a mere special case of allowing the transmit signal shape to vary from pulse to pulse. As already pointed out, this can be done without affecting the radar signal. Such variation may however not only be variable delay corresponding to varying PRF but may provide the required synchronism to several TV bands within the transmitted radar band. We now describe how this can be achieved.

The waveform universally used in combination with pulse compression is so-called linear FM, in which a linear frequency modulation is exploited throughout the transmit interval. At a large FM rate a certain frequency within the radar signal spectrum is reached soon after the onset of transmission, at a small FM-rate this instance occurs later. Rather than using a linear FM-signal one can thus exploit a non-linear signal, which reaches a certain set of predetermined frequencies within the radar spectrum at certain predetermined times. This non-linear FM signal would consist of linear components, which however are temporally disjunct and add to form the overall signal. Clearly for this reason such a non-linear FM-signal will act well as a transmit signal.

This type of non-linear FM-signal is directly suitable for the discussed purpose of establishing synchronism to the TV frame rate. In fact the PRF rate suitable for VHF SAR operation is of the order 1 kHz, which means that the transmit signal is of a duration shorter than 1 millisecond. For this type of signal to establish synchronism with one or several 50 Hz references (the frame rates of different TV bands encountered) would only require minor adjustments of the FM frame rates and is certainly without any effect on radar performance whatsoever.

According to a third aspect of the invention, the radar transmit signal is formed as a pulse compressed signal whose characteristic is constituted by segments of linear FM. Moreover, the pulse compression transmit signal is arranged such that for a given TV channel frequency, the time between the radar pulses coinciding in frequency with the TV signal is an integer divisor to the TV frame period. In this manner the radar interference shows as a constant area in the TV picture over time.

More preferably, the radar signal corresponds advantageously to an equal complete number of TV lines. In so far more channels are present in the radar range, the linear segments are arranged such, that the above criteria applies for all TV channels.

Practically, the type of ever changing transmit signal required can be obtained by modern arbitrary waveform generator—AWG—technique in which it is possible to update the AWG memory at very rates consistent with the PRF-rate. Hence the required adaptation of transmit signal waveform is predicted by a computation based on the received and demodulated TV-signals and the computed data used to update the AWG.

According to a fourth aspect of the invention, the received radar is signal is improved by predicting a TV signal operating in the radar range. The radar signal reception is improved by subtracting the predicted TV interference signal form the received signal.

It is found that there is an important orthogonality aspect of radar and broadcast transmit signals, which may support their cohabitation: The information in a radar signal (giving the position of radar transmitter) is intrinsic in its spatial covariance properties whereas the communication message in a broadcast signal is coded in its temporal covariance properties.

In effect, the radar transmit signal may change randomly from pulse to pulse without affecting its usefulness for the radar application, whereas a communication signal may change randomly from location to location without spoiling its information carrying property. To the latter statement there are two snags. For one, channel equalisation has to be established so that the stationary transfer characteristics of the reception on any site are compensated for. Secondly, if interference comes from a moving radar, transfer properties will change in time, albeit perhaps more slowly than the de-correlation time of the transferred message. If so, channel equalisation will still be possible.

For a broadcast signal—which is intended for human reception in real-time—there must be an attribute of permanency. Indeed, an audio message must remain stationary for tens of seconds in order to allow a listener to interpret it. A moving image must remain correlated for maybe a second for its contents to be understood.

Accordingly, for each frequency (i.e. TV program) in the broadcast band, the radar transmission adopts the phase and amplitude of the broadcast signal to be expected incident on the radar at the particular time this particular frequency is passed in the transmit chirp. Accordingly, the radar will transmit a copy of the broadcast message and the broadcast reception site will receive two superimposed but time translated (?) versions of the same message. To a TV subscriber, the reception will appear as a broadcast signal that has been made subject to multipath propagation. In principle—as will be discussed—so-called channel equalisation may bring back the broadcast signal to its original state.

As for the interference of the broadcast signal on radar reception, its effect is—if the radar transmit signal successfully imitates the broadcast signal—that it will be stationary on pulse compression. In fact, since pulse compression consists of correlating the transmitted signal to the received signal, it will in effect contain the correlation $f(t, \tau)$ between two segments of the broadcast signal separated by fast time $\tau$ and the development of this correlation in pulse-to-pulse time viz. slow time t. Clearly, if the broadcast signal tends to remains correlated over extended periods in slow time, $f(t, \tau)$ will tend to remain constant in slow time. Thereby, its spectral support in the Doppler domain will be small. As will be seen, its spread in Doppler may indeed be much smaller than the SAR Doppler bandwidth and broadcast interference may be mitigated by bandpass filtering in the Doppler domain.

The filtering according to the invention accomplishes a reduction of interference energy by the order of 40 dB. It is thereby on parity with the stochastic noise component, which by its nature cannot be removed from the received signal. Consequently, the degrading effect of radio interference on SAR imagery might be substantially removed.

Further advantages will appear from the following detailed description of the invention.

DETAILED DESCRIPTION OF PREFERRED EMBODIMENTS OF THE INVENTION

Moving imagery displays both spatial and temporal redundancies, enabling if one wish significant data compression. Unlike the situation for digital video, no utilisation of this possibility is made in analogue video. The spatial redundancy is associated with the psychological fact that in order to be perceived by humans, a video image may only consist of a limited number of spatial features. Hence, for most parts in a video sequence, any given excerpt of a TV line in a particular frame decays (i.e. change colour along the line) only slowly along the line. Similarly, it is likely that such a part of a TV line will be strongly correlated to the corresponding parts in subsequent lines (i.e. temporal correlated). The temporal redundancy consists of that given part of an image in subsequent frames that are likely to be strongly correlated. In particular there may appear a strong correlation between subsequent frames of the "scene content" of a TV image since it remains relatively constant, cf. FIGS. 5 and 6, only interrupted by sudden "scene changes" of a duration of a second or longer.

Figure 1:
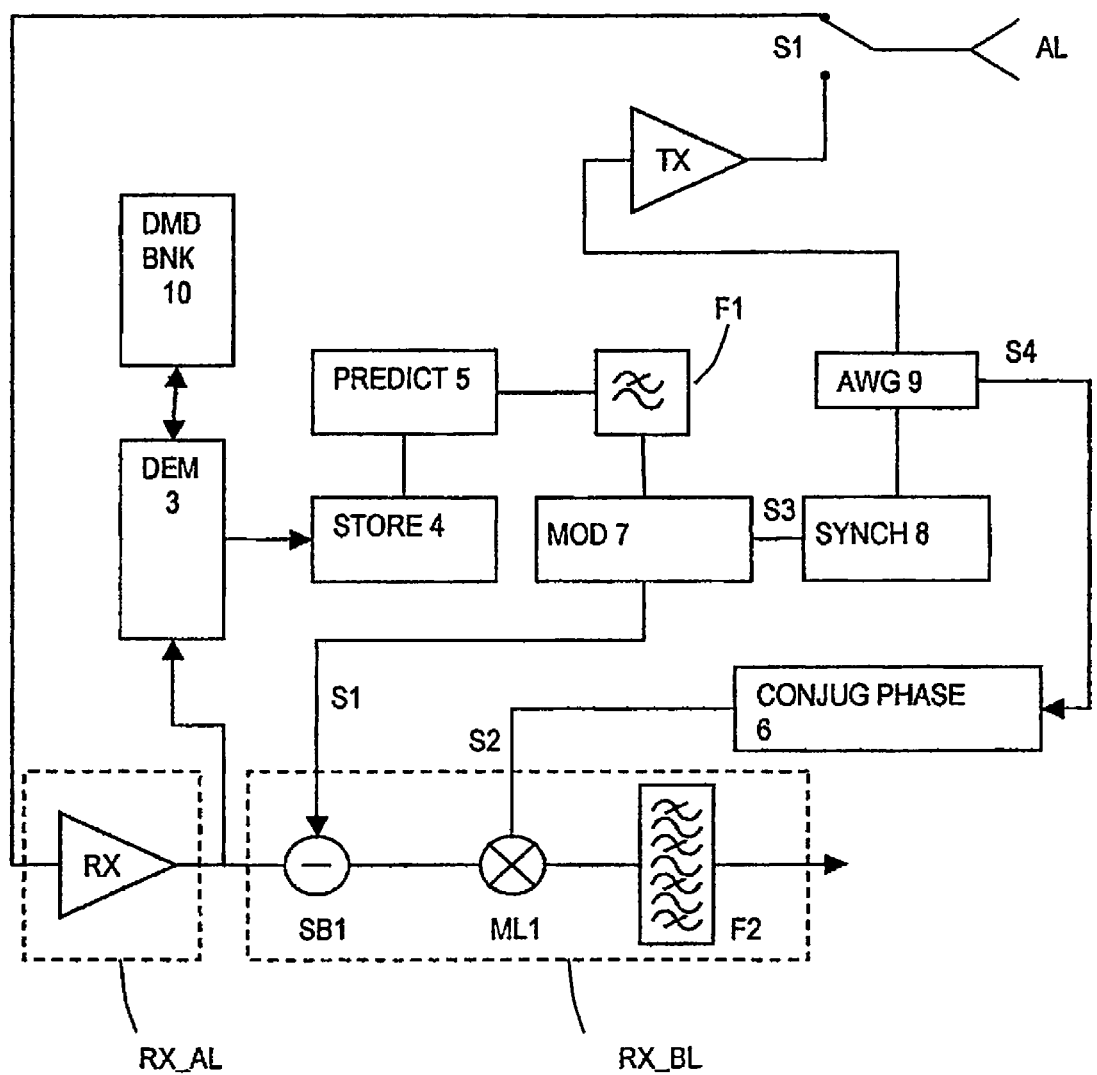
FIG. 1 shows a first embodiment of the radar system according to the invention, FIG. 1_1 shows a second embodiment of the radar system according to the invention, FIG. 1_2 shows a third embodiment of the radar system according to the invention, FIG. 2+3 shows the embodiment of FIG. 1 implemented in a VHF/UHF SAR system comprising two bar antennas.

In FIG. 1, the radar system according to the invention comprises an aerial AL, an input/output switch SW1, a receiving amplifier RX, a demodulator 3 working according to usual demodulation principles for the given communication signal prevailing, a demodulation bank 10 containing frequencies and demodulation forms pertaining to given communication signals prevailing in a given geographical range of interest. According to one embodiment of the invention the demodulation bank and the demodulator corresponds to a usual TV tuner.

In the embodiment shown in FIG. 1, there is moreover provided a first input switch S1, an attenuator 14 and a second input switch 15. The receiver captures radio interference frames, a sequence of which is exploited to predict the interference component of the combined signal of interference and radar response.

The radar system moreover comprises, a storing unit 4, a prediction unit 5, a filter F1, a modulation unit 7 working according to known modulation forms pertaining to given communication signals at given frequencies, a synchronisation unit 8. In the most simple form, the prediction unit 5, simply repeats the last received picture.

The modulation unit 7 produces a modulated signal, which is a prediction of the next TV frame in the time domain.

According to a preferred embodiment shown in FIG. 1 and also in FIG. 1_2, the signal of the modulation unit 7, S1, is subtracted from the received combined radar/interference signal in subtract node SB1 to separate the radar data. In this manner, the received signal is enhanced and the RFI interference is suppressed. The possibility of this scheme relies on the low pass filtering of the predicted interference signal. Because of this, radar data, which are added to interference and subsequently subtracted, are first filtered to below a few Hertz of Doppler bandwidth, viz. to the band, which anyway will be notched in the subsequent 2-dimensional filtering (explained in connection with FIG. 3). The radar system moreover comprises an arbitrary wave generating (AWG) unit 9, a transmit amplifier TXL and a 2-dimensional filter (shown in FIG. 3). The generator is operated in synchronisation with the predicted interference signal, such as a TV signal.

The arbitrary wave generator 9 is adapted for generating an arbitrary transmit wave at periodical interruptions at a given PRF frequency, e.g. at 30 KHz. The outputted signal may moreover be subject to pulse compression. Under pulse compression, which is well known in the art, the frequency of the transmitted pulse is increased at a constant rate (Chirp). In the receiver it is introduced in a linear filter that decreases linearly with frequency at the same rate (conjugate filter characteristic) as the transmitted signal. The matched filtering scheme effect is that the received pulse.

According to a second embodiment of the invention, a subtraction unit 12 and a phase conjugate unit 6 are provided. The conjugate phase unit 6 is conjugate to the transmit pulse compression filter used in arbitrary waveguide generator AWG 9. The arbitrary wave generator 9 is of a standard type used for instance in coherent VHF SAR.

According to the second embodiment of the invention, the pulse segments are established, by means of synchronisation unit 8 and arbitrary waveform generator 9 for each PRF pulse in a manner, which shall be explained in connection with FIG. 7. As mentioned above, since the filtering used in arbitrary waveform generator and in conjugate phase unit 6 are conjugate, according to principles known from pulse compression, the signal can be rendered arbitrary without influencing radar operation. This embodiment is further emphasized in the FIG. 1_1 embodiment.

The coherency of the interference may be used to separate it from the radar ground response, in which case the interference signal can be registered essentially continuously. In this scheme, in the demodulation of the interference, the radar response will appear as additional noise, which will be weak compared to the interference. It would thus not upset the interference demodulation scheme or the derived phase estimate.

According to a preferred embodiment of the invention,— by predicting the broadcast signal (repeating at least parts of it) according to the known modulation technique pertaining to a given channel—the (return of the) transmit radar waveform, transmitted in each PRF pulse, is modified or adapted to be synchronised with the broadcast TV signals incident on the radar at the moment of transmission.

Figure 4:
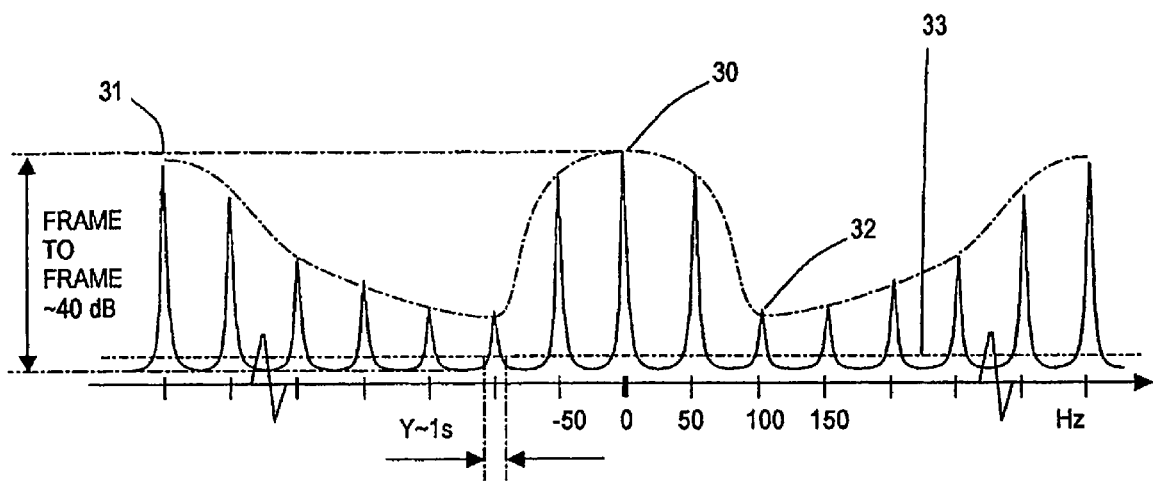
FIG. 4 shows a Fourier transform of the radar signal (after node F2 in FIG. 1_1) of the radar signal under strong RFI interference.

In FIG. 4, the effects of a typical TV signal in the filter F2 in the radar unit is shown. It shows a relatively constant peak amplitude at around 0 Hz (30) corresponding to the frame-to-frame stability of 50 Hz and the line-to-line stability of 350 Hz (31). The intermediate peaks vary along the variations in the information content. The level of the radar signal is below the level indicated by line 33.

Figures 5, 6:
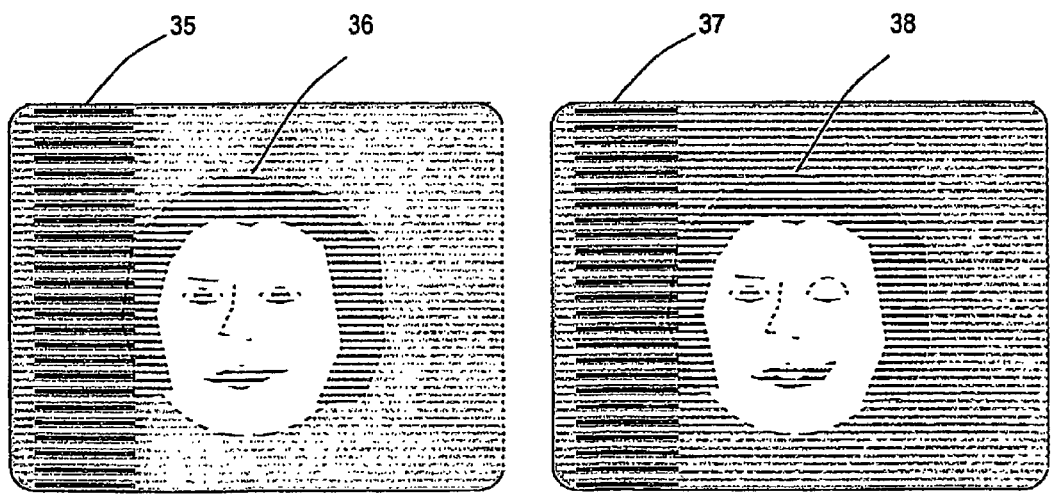
FIG. 5 shows the effects of the adaptively filtered radar signal according to the invention on a first TV picture signal.
FIG. 6 shows the effects of the adaptively filtered radar signal according to the invention on a second TV picture signal seconds after the signal shown in FIG. 5.

In FIGS. 5 and 6, which relates to two subsequent analogue TV pictures, the influence of the modified radar pulses according to the invention on the TV pictures have been shown. It appears that the radar influence on the TV signal constitutes the same area in the TV picture. The (phase of the) radar signal is synchronous with the TV frame periodicity. The frame-to-frame correlation could typically amount to 0.02 s-1 s. The radar signal is adapted in such a way that a vertical "band" appearing on the screen occupies the same position on the screen over time. Moreover, preferably the radar interference on the television signal according to the invention with the line periodicity of the television picture signal. The line-to-line correlation of the radar signal could range between 0.1 ms-0.01 s.

As mentioned above, since the nature of the television signal is such that the information content relating to the same area of the screen is often constant over periods of time, the radar signal can be predicted successfully, simply by repeating the "information content" associated with the given area in question based on a reception of the last picture received. Accordingly since the radar signal imitates the television signal, the television signal is inflicting a minor influence on the radar reception and is hence rendered to coexist with the television signal. Likewise, the radar signal is inflicting only minor effects on TV reception.

Figure 2:
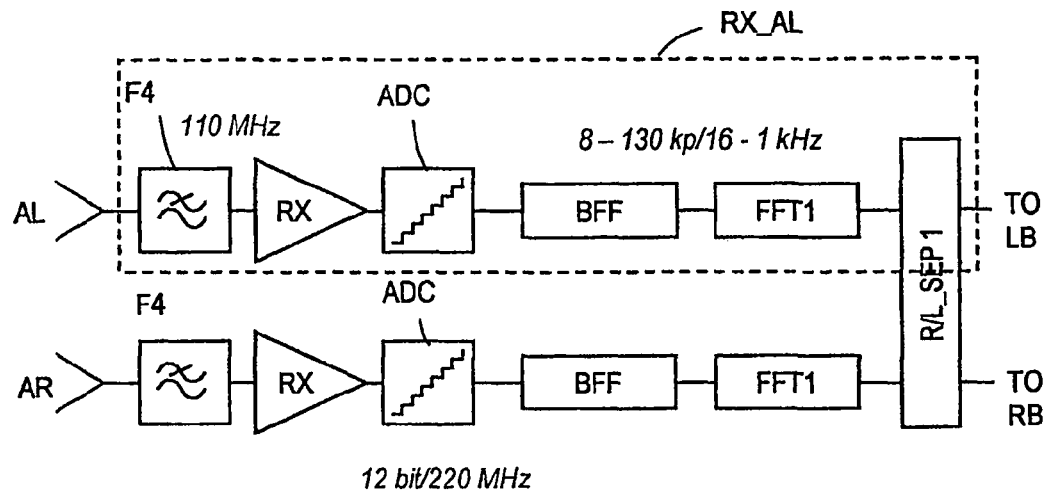
Figure 3:
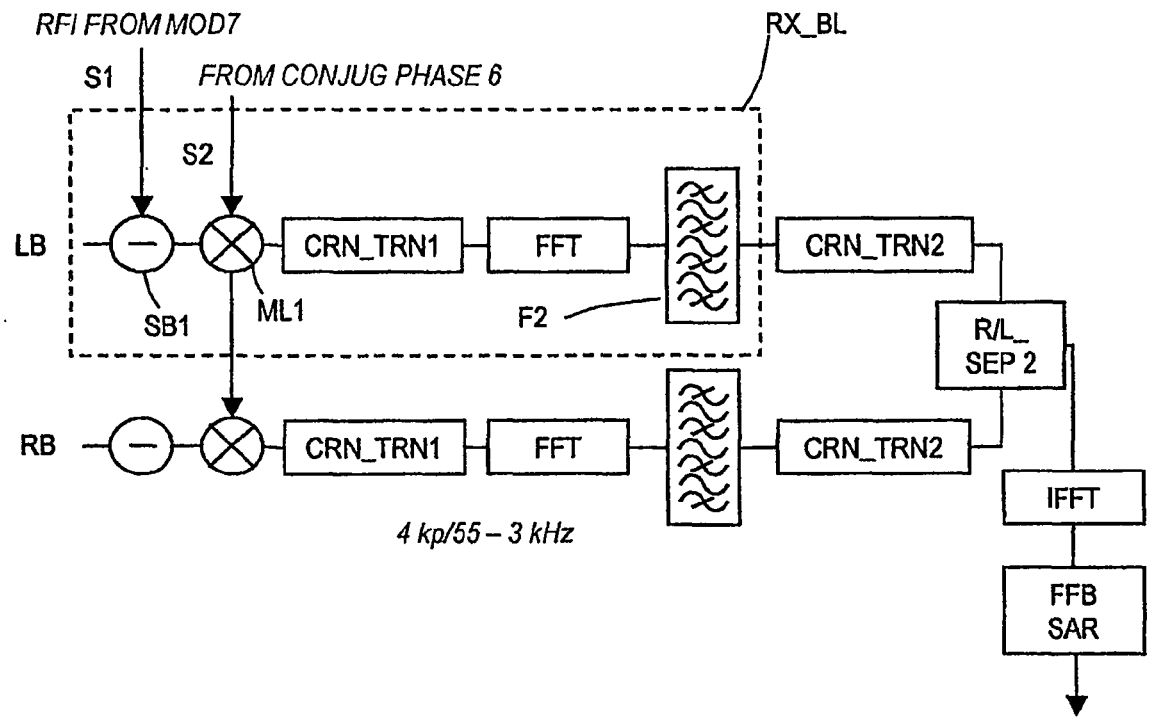

In FIGS. 2 and 3 an implementation of the circuit shown in FIG. 1 has been shown in more detail. FIGS. 2 and 3 relates to a coherent synthetic aperture radar system, denoted Coherent All Radio Band Sensing (CARABAS), of which type for instance has been described in U.S. Pat. No. 4,866,446. The system comprises two bar antennas, AL and AR, mounted on a flying vehicle parallel to the direction of flight for scanning the ground to the left and the right side of the vehicle. The circuit of FIG. 1 is provided in both left and right channels as illustrated by FIGS. 2 and 3.

As illustrated in FIG. 2, the "left" side circuit RX_AL comprises an input filter F4 . . . , amplifier RX, Analogue/Digital converter, ADC, buffer BFF, first Fast Fourier Transform unit FFT and Right/Left separation step 1.

As shown in FIG. 3, the left side circuit RX_AL moreover comprises, as mentioned above subtracting unit SB1, multiplication unit ML1, corner turn unit CRN_TRN, second Fast Fourier Transform unit, FFT2, filter F2, second corner turn unit CRN_TRN2, second right left separation step R/L_SEP2, inverse fast Fourier transform unit IFFT and FFB_SAR unit providing a digital output for further data processing of radar data, such as presentation of SAR data.

Figure 7:
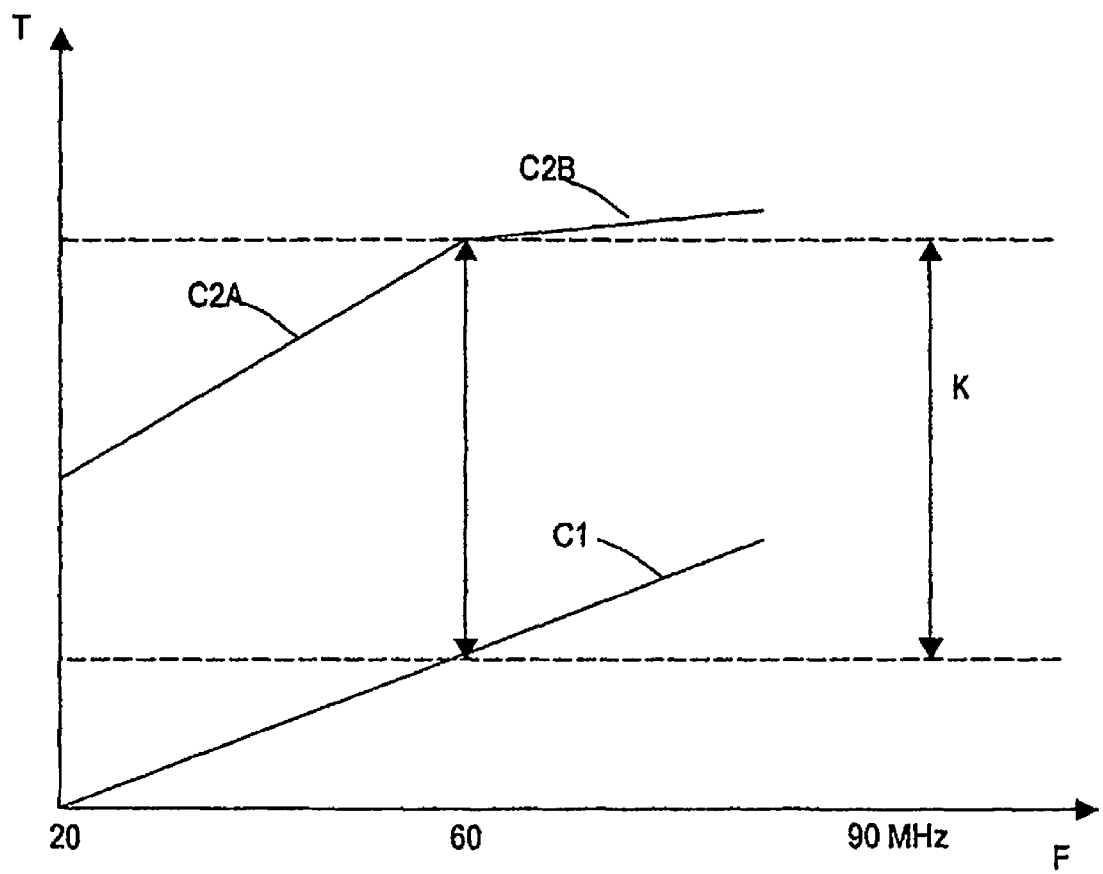
FIG. 7 shows a preferred embodiment of the pulse compression according to the invention operating in synchronisation with a TV signal.

In FIG. 7, the manner of adapting the radar pulses in order to bring them into synchronisation with the TV signal is shown in a schematic example, where a given TV channel is transmitted at 60 MHz. A first PRF pulse C1 is transmitted at a given linear chirp rate.

For the subsequent PRF pulse, the pulse compression is arranged as two linear segments C2A and C2B such that for the frequency 60 Mhz, the time between the PRF pulse—or the phase—are in synchronisation with the periodicity, K, of the TV picture frames. Thereby, the major spikes of TV interference shown in FIG. 4, can be filtered in a comb filter.

It should be understood that even though one major source of radio interference has been dealt with—namely analogue TV broadcasts—the invention is applicable to other types of radio interference. One may also encounter digital modulation systems. In e.g. OFDM—orthogonal frequency division multiplexing—the TV signal is de-multiplexed into—for VHF—6000 channels, each holding a 64 place complex amplitude for 1 ms. The amplitudes are read off and put into an IFFT turning them into a time message of 6 MHz bandwidth and 1 ms duration at any suitable carrier frequency. Clearly there is no difference in principle between this modulation and analogue modulation as regards the possibility of interference prediction, but possibly for the fact that for OFDM the exact key to the modulation must be at hand and cannot be "guessed".

The invention claimed is:

1. A radar unit, comprising:
an antenna;
an arbitrary waveform generator to issue an arbitrary radar waveform signal at a given pulse repetition frequency, the arbitrary waveform generator being adapted to adjust the phase of the radar waveform signal as a function of a phase adjustment signal;
a transmit amplifier coupled to the antenna;
a receive unit coupled to the antenna to receive multiple radar pulses to retrieve a Doppler spectrum;
a 2D filter for generating associate values of radar response and coordinate data;
a noise predictor coupled to the receiver to receive at least one prevalent radio frequency interference;
a demodulation and decoding bank comprising known information on the modulation and coding principle of the prevalent radio frequency interference signal, the radio frequency interference signal typically operating according to a predetermined refresh frequency at which redundant information is repeated;
said noise predictor operative to receive, demodulate and decode the information content of the at least one radio frequency interference signal, wherein:
the arbitrary wave generator is adapted to generate pulse-compressed chirps, and wherein the arbitrary wave generator is synchronized with the at least one prevalent radio frequency interference signal, whereby,
the arbitrary wave generator is controlled to produce an overall radar pulse composed of at least a first segment and a second segment whose time/frequency rates may differ from one another,
whereby the overall radar pulses vary from pulse to pulse such that for the coinciding frequency of the at least one prevalent radio frequency interference signal, the time between radar pulses is an integer divisor of the periodicity of the at least one prevalent radio frequency interference signal.

2. The radar unit according to claim 1, wherein the overall pulse composed of the first and second segment is formed so in relation to a previous radar pulse, that the frequency range is the same as the frequency range of the previous pulse and the duration of the overall pulse is the same as the duration of the previous pulse.

3. The radar unit according to claim 1, wherein radar pulses constitute linearly frequency modulated segments of differing time/frequency rates.

4. The radar unit according to claim 1, wherein the frequency spectrum is divided into a plurality of sub-channels, each sub-channel corresponding to a regulatory radio channel used for one radio or television information source, the radar unit comprising a noise predictor for each radio frequency interference sub-channel overlapping with the radar range.

5. The radar unit according to claim 4, wherein the overall pulse is formed so that the composite transmit radar pulses varies from pulse to pulse such that for the coinciding frequency of each radio frequency interference signal, the time between radar pulses is an integer divisor of the periodicity of each corresponding radio frequency interference signal.

6. The radar unit according to claim 1, wherein radar pulses constitute linearly frequency modulated segments.

7. The radar unit according to claim 6, wherein the radar pulses are temporarily disjunct.

8. A method of adapting pulses transmitted from a radar unit, comprising:
receiving and demodulating at least one prevalent radio frequency interference signal;
sensing the periodicity of a component of the at least one prevalent radio frequency interference signal having a given radio frequency interference frequency coinciding with a frequency of the radar pulses;
wherein an arbitrary wave generator generates pulse-compressed chirps, wherein the arbitrary wave generator is controlled to produce an overall radar pulse composed of at least a first segment and a second segment whose time/frequency rates may differ from one another, and wherein the radar unit is to receive multiple radar pulses to retrieve a Doppler spectrum, and wherein the arbitrary wave generator is synchronized with the at least one prevalent radio frequency interference signal, whereby the overall radar pulses vary from pulse to pulse such that for the coinciding frequency of the at least one prevalent radio frequency interference signal, the time between radar pulses is an integer divisor of the periodicity of the at least one prevalent radio frequency interference signal.

9. The method according to claim 8, wherein the overall pulse composed of the first and second segment is formed so in relation to a previous radar pulse, that the frequency range is the same as the frequency range of the previous pulse and the duration of the overall pulse is the same as the duration of the previous pulse.

10. The method according to claim 8, wherein radar pulses constitute linearly frequency modulated segments of differing time/frequency rates.

11. The method according to claim 8, wherein the frequency spectrum is divided into a plurality of sub-channels, each sub-channel corresponding to a regulatory radio channel used for one radio or television information source, the radar unit comprising a noise predictor for each radio frequency interference sub-channel overlapping with the radar range.

12. The method according to claim 8, wherein the overall pulse is formed so that the composite transmit radar pulses varies from pulse to pulse such that for the coinciding frequency of each radio frequency interference signal, the time between radar pulses is an integer divisor of the periodicity of each corresponding radio frequency interference signal.

13. The method according to claim 8, wherein radar pulses constitute linearly frequency modulated segments.

14. The method according to claim 8, wherein the periodicity of the radio frequency interference signal corresponds to the frame periodicity or line periodicity of a television signal.

* * * * *